(12) United States Patent
Hsu et al.

(10) Patent No.: US 8,698,807 B2
(45) Date of Patent: Apr. 15, 2014

(54) INTUITIVELY CONNECTING GRAPHICAL SHAPES

(75) Inventors: Ming-Fa Hsu, Taoyuan (TW); Chen-Yu Kuo, SanChung (TW); Pei-Hsuan Lin, Taipei (TW); Kang-Liang Liu, Yonghe (TW); Mark D. Rogalski, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 12/239,283

(22) Filed: Sep. 26, 2008

(65) Prior Publication Data

US 2010/0079465 A1 Apr. 1, 2010

(51) Int. Cl.
*G06T 11/20* (2006.01)
*G06T 11/40* (2006.01)

(52) U.S. Cl.
CPC ............. *G06T 11/206* (2013.01); *G06T 11/203* (2013.01); *G06T 11/40* (2013.01)
USPC ...................... 345/440; 345/440.1; 345/440.2; 345/441; 345/442; 345/443

(58) Field of Classification Search
CPC ...... G06T 11/206; G06T 11/203; G06T 11/40
USPC ........................... 345/440–442; 715/772, 825
See application file for complete search history.

(56) References Cited

U.S. PATENT DOCUMENTS

| | | | |
|---|---|---|---|
| 4,698,625 A | 10/1987 | McCaskill et al. | |
| 5,278,951 A * | 1/1994 | Camacho et al. | 345/440 |
| 5,428,734 A | 6/1995 | Haynes et al. | |
| 5,432,897 A * | 7/1995 | Tatsumi et al. | 345/440 |
| 5,634,095 A | 5/1997 | Wang et al. | |
| 5,786,805 A | 7/1998 | Barry | |
| 6,002,399 A | 12/1999 | Haine et al. | |
| 6,377,259 B1 * | 4/2002 | Tenev et al. | 345/440 |
| 6,417,865 B1 | 7/2002 | Bou | |
| 6,567,070 B1 | 5/2003 | Light et al. | |
| 2001/0010518 A1 * | 8/2001 | Saitou | 345/433 |
| 2002/0154117 A1 * | 10/2002 | Saitou | 345/440 |
| 2006/0136833 A1 | 6/2006 | Dettinger et al. | |
| 2008/0313565 A1 * | 12/2008 | Albertson | 715/825 |
| 2009/0199123 A1 * | 8/2009 | Albertson et al. | 715/772 |

\* cited by examiner

*Primary Examiner* — Jin-Cheng Wang
(74) *Attorney, Agent, or Firm* — DeLizio Gilliam, PLLC

(57) ABSTRACT

In using an application's drawing feature, users typically use connecting lines between graphical shapes to depict a relationship between the shapes. Drawing connecting lines between two or more graphical shapes within an application can be a time consuming, manual task. An application that automatically generates connecting lines between shapes, based on spatial relationships among the shapes, can reduce the amount of time for drawing a diagram. Functionality can be implemented to generate connecting lines between 1:n shapes based on proximity among the shapes and/or contact between shapes. Automatically generating connecting lines among shapes based on spatial relationships among the shapes allows generating of the connecting lines based on manipulation of shapes, which typically have a larger surface area than a line. Manipulating a larger surface area can be easier than manipulating a line.

19 Claims, 4 Drawing Sheets

INTUITIVELY CONNECTING GRAPHICAL SHAPES

BACKGROUND

Embodiments of the inventive subject matter generally relate to the field of computer software, and more particularly, to techniques for connecting graphical shapes.

Applications typically provide drawing features to enable users to represent information in a visual format. In creating schematics, flowcharts, graphs, and other diagrams, users can use connecting lines to represent relationships between two or more graphical shapes. Typically, users repeatedly go through many steps that may involve selecting a line tool, clicking on a first shape, and dragging a mouse pointer towards the periphery of a second shape.

SUMMARY

Embodiments include a method directed to intuitively connect graphical shapes. It is determined that a selected graphical shape is positioned within a first proximity threshold of a first graphical shape and a second proximity threshold of a second graphical shape. While the selected graphical shape remains positioned within the first proximity threshold, tentative connecting lines between the selected graphical shape and the first graphical shape are automatically generated and displayed. While the selected graphical shape remains positioned within the second proximity threshold, tentative connecting lines between the selected graphical shape and the second graphical shape are also automatically generated and displayed. The tentative connecting lines are converted into persistent connecting lines when the selected graphical shape is unselected.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, well-known instruction instances, protocols, structures, and techniques have not been shown in detail in order not to obfuscate the description.

Introduction

In using an application's (e.g., word processing applications, spreadsheets, drawing tools, etc.) drawing feature, users typically use connecting lines between graphical shapes to depict a relationship between the shapes. Drawing connecting lines between two or more graphical shapes within an application can be a time consuming, manual task. An application that automatically generates connecting lines between shapes based on spatial relationships among the shapes can reduce the amount of time for drawing a diagram. The application can generate connecting lines between 1:n shapes when based on proximity among the shapes and/or contact between shapes, as well as different types of connecting lines. Automatically generating connecting lines among shapes based on spatial relationships among the shapes allows generating of the connecting lines based on manipulation of shapes, which typically have a larger surface area than a line. Manipulating a larger surface area can be easier than manipulating a line.

Figure 1:
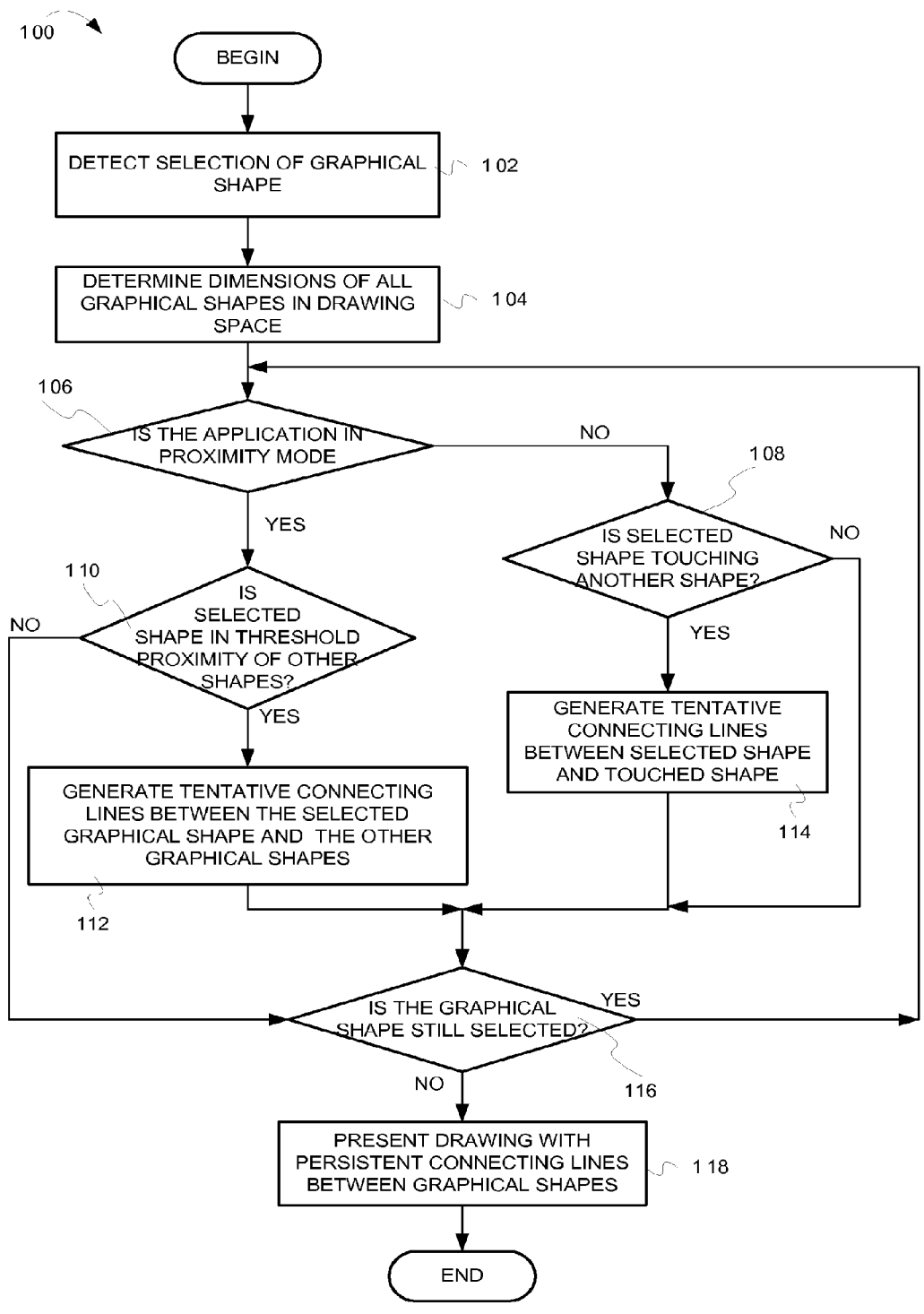
FIG. 1 is a flow diagram illustrating example operations for drawing connecting lines between two or more graphical shapes in a drawing space of an application.

FIG. 1 is a flow diagram illustrating example operations for drawing connecting lines between two or more graphical shapes in a drawing space of an application. The flow 100 begins at block 102.

At block 102, a graphical shape is selected. For example, a user mouse clicks on the graphical shape, uses a keyboard to select the graphical shape, etc. The flow continues at block 104.

At block 104, dimensions of all graphical shapes in the application's drawing space are determined. Graphical shapes comprise geometric shapes (e.g., square, circle, rectangle, hexagon, etc.) and user defined shapes (e.g., randomly drawn polygons, curved shapes, freeform shapes, etc.) The graphical shapes' dimensions may be stored in the form of a geometric figure name and coordinates (e.g., graphical shape A is a polygon with coordinates at (5, 5), (20, 5), (10, 10), (3, 15)). In some instances, the shapes' origin, area, and perimeter may be stored. In other instances, the graphical shapes' dimensions may be stored with reference to another graphical shape in the drawing space. Inter-shape distances (e.g., distance between the centers of the graphical shapes, perimeter-to-perimeter distance, etc.) may also be stored. The flow continues at block 106.

At block 106, it is determined whether the application is in proximity mode. In the proximity mode, when the selected graphical shape is positioned (e.g., dragged, pasted, tabbed, etc.) within a threshold proximity of one or more other graphical shapes in the drawing space, the application generates connecting lines between the selected shape and the one or more other shapes. The threshold proximity can be defined as a distance (e.g., pixels) between shape boundaries, center points, etc., an area that extends a certain distance beyond the boundaries of a graphical shape, etc. In some instances, the proximity mode may be the application's default mode, while in other instances, users may have the option of selecting the proximity mode when the application is launched. In some instances, all the graphical shapes in the drawing space may have the same proximity threshold, while in other instances, users may have the option of configuring a different proximity threshold for each graphical shape in the drawing space. If it is determined that the application is in proximity mode, the flow continues at block 110. Otherwise, the flow continues at block 108.

At block 110, it is determined whether the selected graphical shape is in the threshold proximity with one or more other graphical shapes. Threshold proximity indicates a maximum distance (e.g., pixels) between two graphical shapes, which triggers generation of a tentative connecting line between the two graphical shapes. The tentative connecting line, between the two shapes, is generated when the inter-shape distance is less than or equal to the threshold proximity. The application can determine a distance between the selected graphical shape and the one or more other graphical shapes' perimeters or use a mathematical barycenter of the graphical shapes as a point to calculate inter-shape distances. The application can then compare the determined inter-shape distance with the threshold proximity, and automatically generate connecting lines if the determined distance is equal to or less than the threshold proximity.

Figure 2:
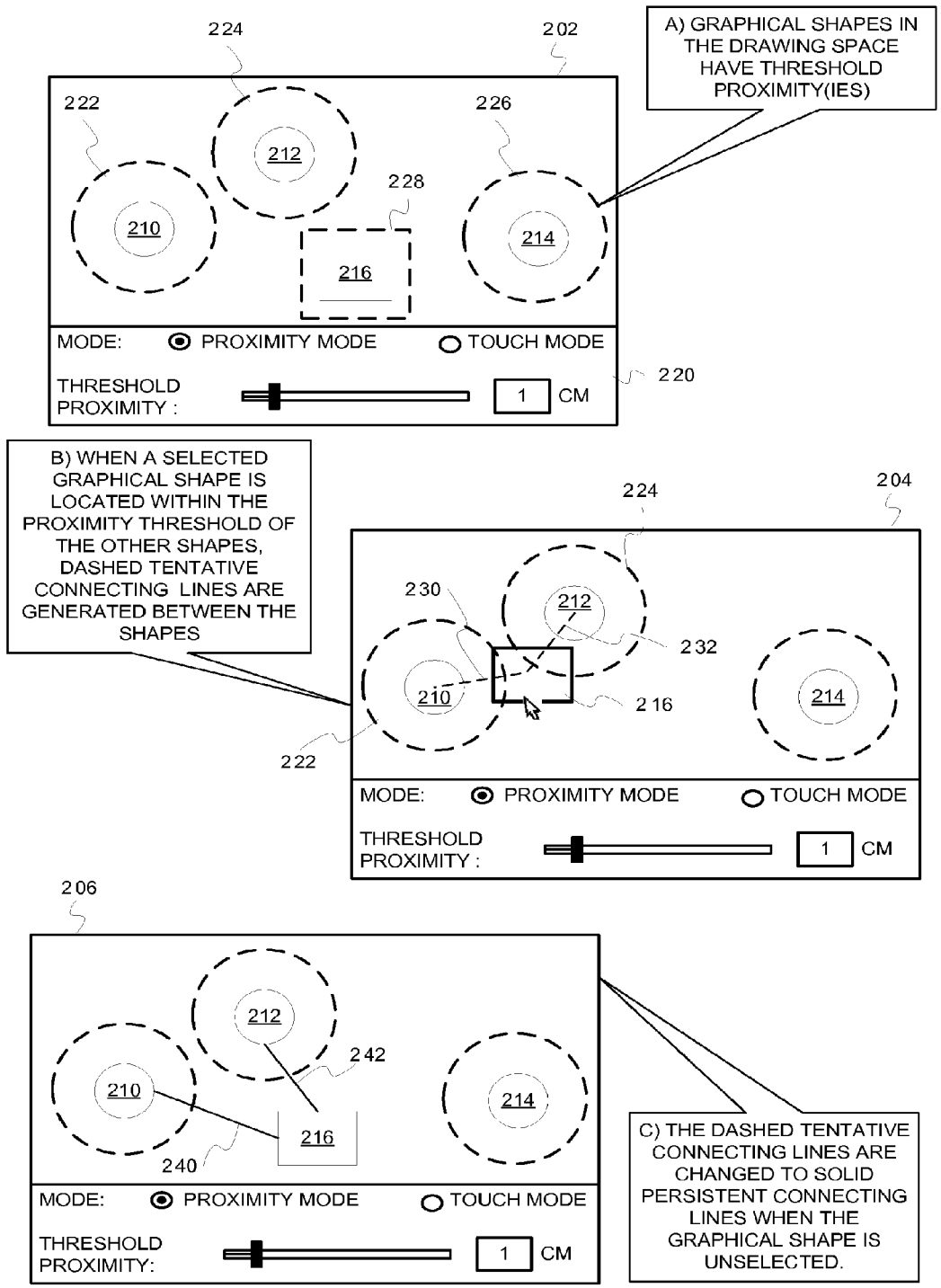
FIG. 2 is an example conceptual diagram illustrating drawing operations in proximity mode.

FIG. 2 is an example conceptual diagram illustrating drawing operations in proximity mode. Screenshot 202 depicts four graphical shapes—three circles 210, 212, and 214, and a rectangle 216. Graphical shape 216 is to be connected to shapes 210 and 212. The screenshot 202 also depicts a menu 220 indicating that the application is in proximity mode with a threshold proximity of 1 cm (depicted by dashed concentric lines around the four shapes and indicated at stage A). The dashed concentric lines 222, 224, 226, and 228 are the proximity thresholds of the graphical shapes 210, 212, 214, and 216 respectively. The threshold proximity can be configured by a user or by the application. In screenshot 204, the user has moved the graphical shape 216 within the proximity thresholds 222 and 224 of the respective graphical shapes 210 and 212. Referring back to FIG. 1, if it is determined that the selected graphical shape is within the threshold proximity of one or more graphical shapes, the flow continues at block 112. Otherwise, the flow continues at block 116.

At block 112, tentative connecting lines are generated between the selected graphical shape and the other graphical shapes. Generating tentative connecting lines allows a user to further manipulate the selected graphical shape and change the tentative connecting lines. An application can distinguish tentative connecting lines from persistent connecting lines with graphical effects (e.g., dashed, dotted, colored, labeled, etc.). The application can use persistent connecting lines between graphical shapes if the user indicates satisfaction with inter-shape relationships expressed by the tentative connecting lines. The user can delete the persistent connecting lines if, at a later stage, the user is not satisfied with the inter-shape relationships expressed by the persistent connecting lines.

Referring back to FIG. 2, at stage B (screenshot 204), when the graphical shape 216 falls within the threshold proximity of graphical shapes 210 and 212, the application generates and displays tentative connecting lines 230 and 232, depicted as dashed lines, between the selected graphical shape 216 and both graphical shapes 210 and 212 respectively. The application continues to display the tentative connecting lines while the graphical shape 216 is selected (e.g., while the user holds down a mouse button, until focus is changed, etc.). Referring back to FIG. 1, the flow continues at block 116.

At block 116, it is determined whether the selected graphical shape is still selected. The application maintains the tentative connecting lines between the graphical shapes as long as the selected graphical shape remains selected. If it is determined that the selected graphical shape is still selected, then flow continues at block 106. Otherwise, the flow continues at block 118.

At block 118, persistent connecting lines are generated, between the now unselected graphical shape and the other graphical shapes, replacing the tentative connecting lines. Applications can present the generation of the persistent connecting lines by graphically displaying a change from dashed lines to solid lines, changing colors of the lines, etc. The release of the mouse button may act as an indication that the user is satisfied with the tentative connecting lines representing the relationships between the graphical shapes. The release of the mouse button may also trigger the application to convert the tentative connecting lines into persistent connecting lines.

In FIG. 2, at stage C (refer to screenshot 206), when the user unselects the graphical shape 216 (e.g., releases mouse button, presses a tab key, etc.), the application converts the dashed tentative connecting lines 230 and 232 into solid persistent connecting lines 240 and 242, respectively. To draw connecting lines between the graphical shape and all of the other graphical shapes, the user can increase the threshold proximity so that all the shapes are in range of shape 216, and then select the graphical shape 216. Referring back to FIG. 1, from block 118, the flow ends.

If it is determined that the application is not in proximity mode at block 106, then, at block 108, it is determined whether the selected graphical shape is touching another graphical shape. In some instances, touching the selected graphical shape to another graphical shape causes the application to switch from proximity mode to "touch mode". In other instances, users may have the option of selecting the connecting mechanism (i.e., proximity mode or touch mode) they would like to use and switching between mechanisms at any time. The touch mode enables users to selectively connect two graphical shapes.

Figure 3:
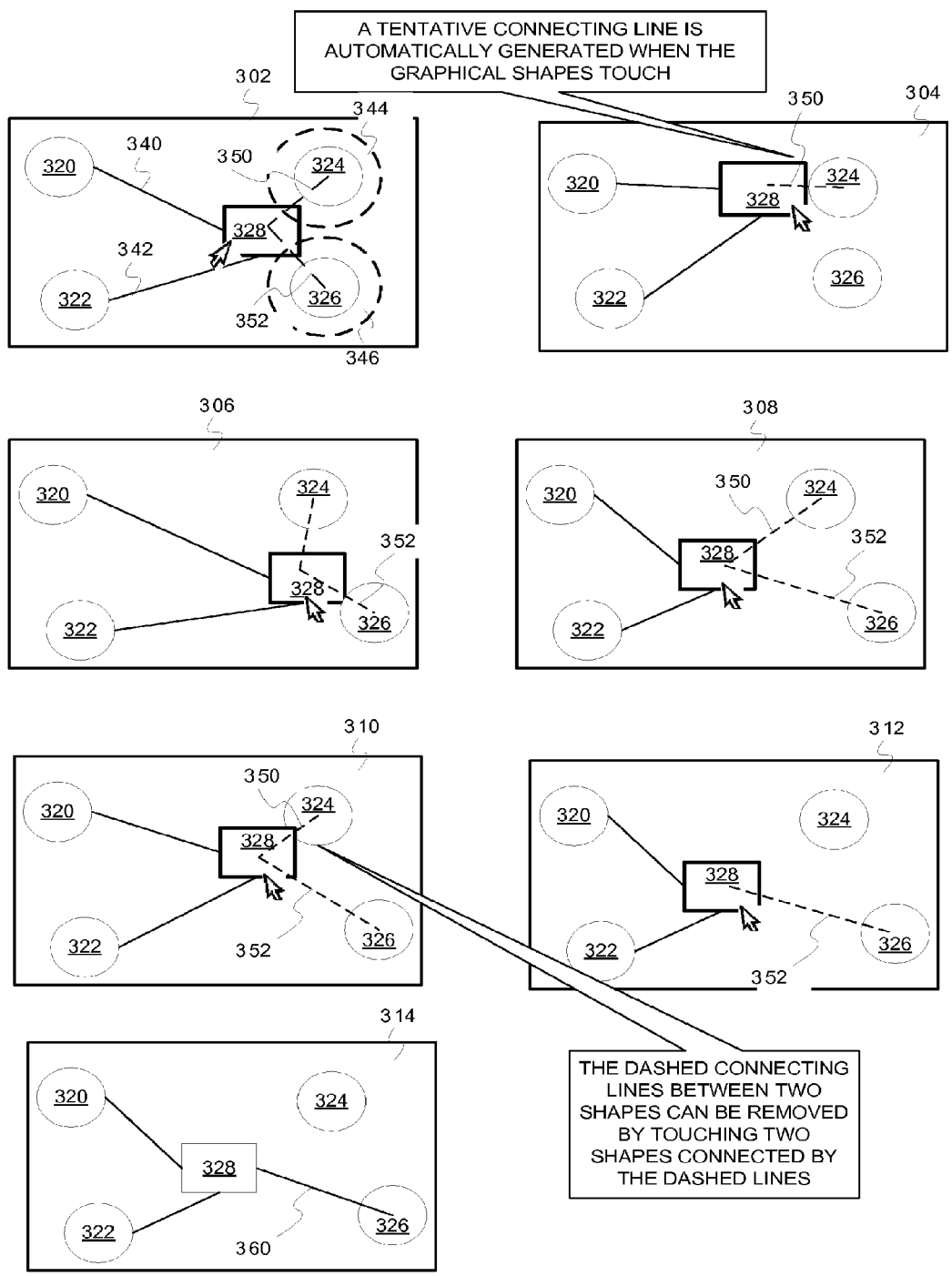
FIG. 3 is an example conceptual diagram illustrating drawing operations in touch mode.

FIG. 3 is an example conceptual diagram illustrating drawing operations in touch mode. FIG. 3 depicts different stages involved in connecting five graphical shapes, the shapes being—a rectangle 328 and four circles 320, 322, 324, and 326. In screenshot 302, graphical shape 328 is connected to shapes 320 and 322 via solid persistent connecting lines 340 and 342 respectively. To connect shape 328 and shape 324, a user drags shape 328 towards shape 324. However, as shown in the screenshot 302, shapes 324 and 326 are in close proximity to each other and the application is in proximity mode. Therefore, when the user clicks on shape 328 and drags it towards shape 324, the shape 328 falls within the proximity thresholds 344 and 346 of the respective graphical shapes 324 and 326. Tentative connecting lines, represented by dashed lines 350 and 352, are presented between shapes 328 and 324 and between shapes 328 and 326, respectively. Because the user does not want to connect shapes 328 and 326, the user drags shape 328 to touch shape 324 as illustrated in a screenshot 304. Touching a graphical shape to another graphical shape can automatically force the application to switch from "proximity mode" to "touch mode". As shown in 304, the dashed tentative connecting line 352 between shapes 328 and 326 is removed and only the tentative connecting line 350 between shapes 328 and 324 is presented. In some instances, the distances between the selected graphical shape 328 and all other graphical shapes in the drawing space may be calculated and monitored. Touch mode may be triggered when the distance between the perimeters of the selected graphical shape and another graphical shape is zero. The application may then present tentative connecting lines (represented as lines that are dotted, dashed, highlighted, colored, etc.) between the two shapes. Referring back to FIG. 1, if it is determined that the selected graphical shape is in contact with another graphical shape, then flow continues at block 114. Otherwise, the flow continues at block 116.

At block 114, tentative connecting lines are generated between the selected graphical shape and the graphical shape in contact with the selected graphical shape. As described earlier, dashed connecting lines can be used to represent tentative relationships between two graphical shapes in contact with each other. Generating tentative connecting lines allows a user to further manipulate the selected graphical shape and change the tentative connecting lines. In FIG. 3

(refer to screenshot 306), when the user touches shape 328 to shape 326, a tentative connecting line 352 is generated between the two shapes 328 and 326. The tentative connecting lines (350 and 352) are maintained between the shapes 328 and 324 and shapes 328 and 326, as long as the graphical shape 328 is selected (refer to screenshot 308). To remove a tentative connecting line between two shapes, the user can drag the selected graphical shape and touch the unwanted target shape. In screenshot 310, the user drags shape 328 to touch shape 324. In screenshot 312, the tentative connecting line 350 between shapes 328 and 324 is deleted and only the tentative connecting line 352 between shapes 328 and 326 is presented. In screenshot 314, when the user unselects the graphical shape 328 (e.g., releases mouse button, presses a tab key, etc.), the application converts the dashed tentative connecting line 352 into a solid persistent connecting line 360. Referring back to FIG. 1, the flow continues at block 116.

The depicted flow diagram is an example meant to aid in understanding embodiments and should not be used to limit the embodiments. Embodiments may perform additional operations, fewer operations, operations in a different order, operations in parallel, and some operations differently. For example, after the application determines that the graphical shape is still selected, the application may determine whether the selected shape is within the threshold proximity to other shapes (in proximity mode) or in contact with another shape (in touch mode). In other words, in proximity mode, the flow 100 may move from block 116 to block 110. In touch mode, the flow 100 may move from block 116 to block 108. In some embodiments, the application may determine its connecting mechanism (i.e., proximity mode or touch mode), at block 106, only once, when a selection of a graphical shape is detected.

Figure 4:
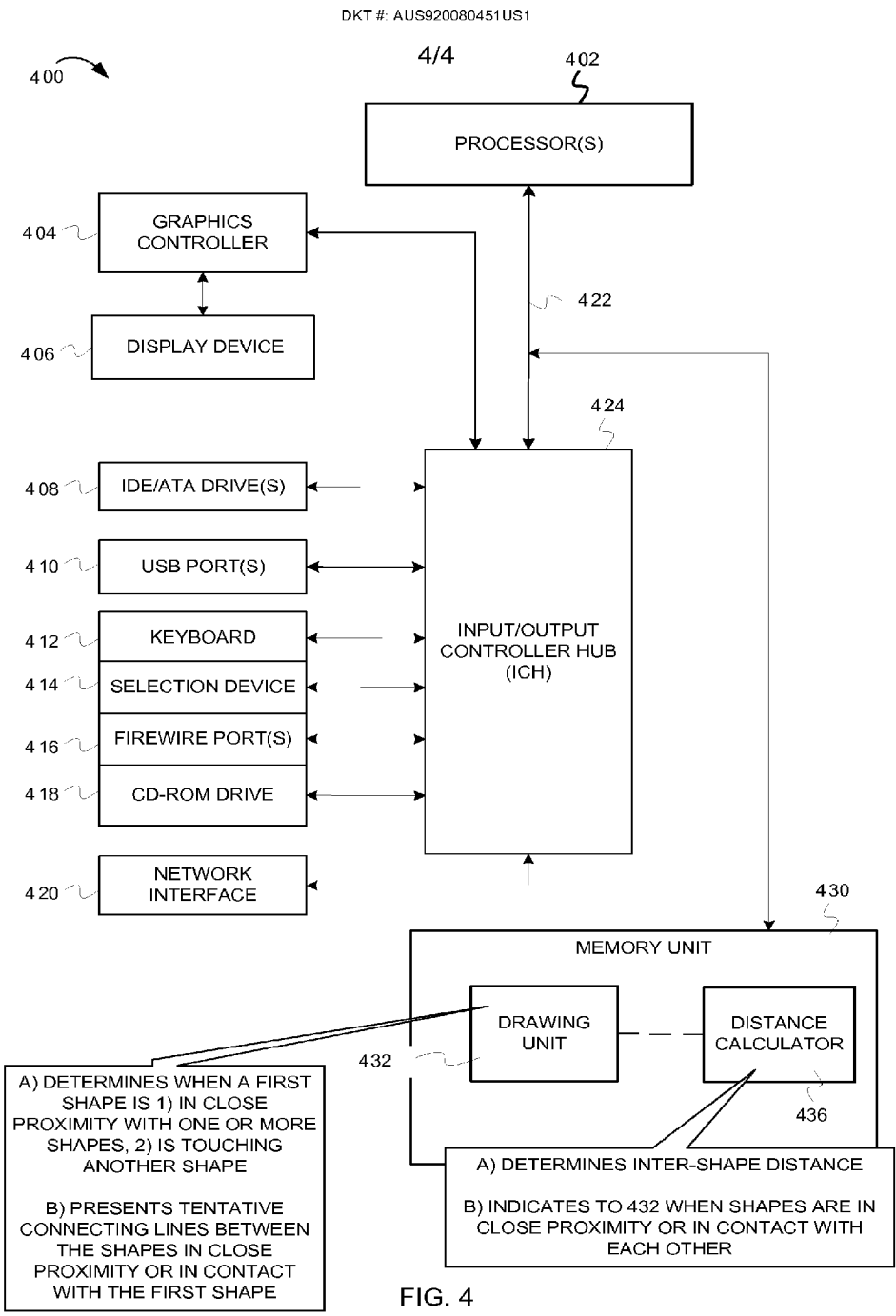
FIG. 4 is an example block diagram illustrating a computer system configured to draw connecting lines between two or more graphical shapes.

FIG. 4 is an example block diagram illustrating a computer system configured to draw connecting lines between two or more graphical shapes.

A computer system 400 includes a processor 402. The processor 402 is connected to an input/output controller hub 424 (ICH), also known as a south bridge, via a bus 422 (e.g., PCI, ISA, PCI-Express, HyperTransport, etc.). A memory unit 430 interfaces with the processor 402 and the ICH 424. The main memory unit 430 can include any suitable random access memory (RAM), such as static RAM, dynamic RAM, synchronous dynamic RAM, extended data output RAM, etc.

In one embodiment, the memory unit 430 comprises a drawing unit 432 coupled with a distance calculator 436. The drawing unit 432 enables users to draw graphical shapes (e.g., standard geometric shapes, user-defined shapes, curved shapes, randomly drawn polygons, freeform shapes, etc.), connections between two or more shapes (e.g., straight lines, curves, etc.), and perform other drawing related actions. The drawing unit 432 can be configured to operate in proximity mode or in touch mode.

When the drawing unit 432 is in proximity mode, users can select a graphical shape and position the selected shape close to one or more other graphical shapes, to create connecting lines between the shapes. The drawing unit 432 interfaces with the distance calculator 436 to determine distances between the selected graphical shape and the other graphical shapes in a drawing space. The distance calculator 436 determines that the selected shape is within a threshold proximity to one or more other graphical shapes and indicates, to the drawing unit 432, the name and/or position of the selected shape and the other shapes. In some instances, the distance calculator 436 can send distance measurements (e.g., distance between the centers of the moving graphical shape and the stationary graphical shapes), to the drawing unit 432, as long as the selected graphical shape is being moved. The drawing unit 432 can perform calculations, determine one or more graphical shapes within the selected shape's threshold proximity, and accordingly present tentative connecting lines between the graphical shapes.

When the distances between the selected shape and one or more of the other shapes are less than or equal to the threshold proximity, the drawing unit 432 creates tentative connecting lines between the shapes to indicate a potential relationship. If the relationship between the shapes (i.e., connections between the shapes) is desired, the user can unselect the previously selected graphical shape (e.g., by releasing the mouse button). The drawing unit 432 converts the tentative connecting lines into persistent connecting lines in response to the user unselecting the graphical shape.

When the drawing unit 432 is in touch mode, it enables users to connect two graphical shapes by moving one shape to touch (or overlap) the periphery of the other shape. The distance calculator 436 determines that two shapes are touching or overlapping each other (e.g., by determining that the distance between the shapes' perimeters is zero), and directs the drawing unit 432 to switch to touch mode. The drawing unit 432 then presents tentative connecting lines between the two shapes in contact with each other.

In some embodiments, the drawing unit 432 and the distance calculator 436 can be subsumed by another application (such as a word processor, spreadsheet, web application, etc.), and can provide functionality for drawing in the application. In some instances, the drawing unit 432 can include individual units for drawing different shapes and connections (e.g., line drawing unit, curve drawing unit, polygon drawing unit, etc.) while in other embodiments, all the drawing operations can be performed by one unit (i.e., the drawing unit 432) as shown in the Figure.

The ICH 424 connects and controls peripheral devices. In FIG. 4, the ICH 424 is connected to IDE/ATA drives 408 (used to connect external storage devices) and to universal serial bus (USB) ports 410. The ICH 424 may also be connected to a keyboard 412, a selection device 414, firewire ports 416 (for use with video equipment), CD-ROM drive 418, and a network interface 420. The ICH 424 can also be connected to a graphics controller 404. The graphics controller is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may even be integrated or subdivided.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

CONCLUSION

While the embodiments are described with reference to various implementations and exploitations, it will be understood that these embodiments are illustrative and that the scope of the inventive subject matter is not limited to them. In general, techniques for connecting two or more graphical shapes described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. One or more machine-readable storage devices having stored therein a program product, which when executed by a set of one or more processors causes the set of one or more processors to perform operations that comprise:
    determining that an electronic drawing space is operating in a touch mode for automatic generation of connecting lines;
    determining that a first graphical shape contacts a second graphical shape in the electronic drawing space;
    automatically generating and displaying a tentative connecting line between the first graphical shape and the second graphical shape in response to the first graphical shape contacting the second graphical shape;
    detecting, after said determining that the first graphical shape contacts the second graphical shape in the electronic drawing space, that the first graphical shape again contacts the second graphical shape;
    determining, in response to said detecting that the first graphical shape again contacts the second graphical shape, that the first graphical shape and the second graphical shape are connected with the tentative connecting line; and
    automatically deleting, in response to said determining that the first graphical shape and the second graphical shape are connected with the tentative connecting line, the tentative connecting line between the first graphical shape and the second graphical shape, wherein there is no tentative connecting line or persistent connecting line between the first graphical shape and the second graphical shape.

2. The machine-readable storage device of claim 1, wherein, prior to said detecting that the first graphical shape again contacts the second graphical shape, said operations further comprise converting the tentative connecting line into a persistent connecting line when the first graphical shape is unselected.

3. The machine-readable storage device of claim 1, wherein the first and the second graphical shapes comprise any one of a defined geometric shape, a user defined shape, and a freeform shape.

4. The machine-readable storage device of claim 1, wherein said operation of determining that the first graphical shape contacts the second graphical shape comprises:
    determining dimensions of the first and the second graphical shapes in the electronic drawing space, wherein the dimensions are represented as at least one of coordinates, graphical shape areas, and shape perimeters; and
    determining that a distance between the perimeters of the first graphical shape and the second graphical shape is zero.

5. The machine-readable storage device of claim 1, wherein said operation of determining that the first graphical shape contacts the second graphical shape comprises determining a distance between a center of the first graphical shape and a center of the second graphical shape.

6. The machine-readable storage device of claim 1, wherein prior to said detecting that the first graphical shape again contacts the second graphical shape, the tentative connecting line between the first graphical shape and the second graphical shape is maintained as long as the first graphical shape is selected.

7. The machine-readable storage device of claim 1, wherein said operation of determining that the first graphical shape contacts the second graphical shape comprises determining that the first graphical shape overlaps the second graphical shape.

8. A method comprising:
    determining that an electronic drawing space of an electronic device is operating in a touch mode for automatic generation of connecting lines;
    determining that a first graphical shape contacts a second graphical shape in the electronic drawing space;
    automatically generating and displaying a tentative connecting line between the first graphical shape and the second graphical shape in response to the first graphical shape contacting the second graphical shape;

detecting, after said determining that the first graphical shape contacts the second graphical shape in the electronic drawing space, that the first graphical shape again contacts the second graphical shape;

determining, in response to said detecting that the first graphical shape again contacts the second graphical shape, that the first graphical shape and the second graphical shape are connected with the tentative connecting line; and automatically deleting, in response to said determining that the first graphical shape and the second graphical shape are connected with the tentative connecting line, the tentative connecting line between the first graphical shape and the second graphical shape, wherein there is no tentative connecting line or persistent connecting line between the first graphical shape and the second graphical shape.

9. The method of claim 8, further comprising, prior to said detecting that the first graphical shape again contacts the second graphical shape, converting the tentative connecting line into a persistent connecting line when the first graphical shape is unselected.

10. The method of claim 8, wherein the first and the second graphical shapes comprise any one of a defined geometric shape, a user defined shape, and a freeform shape.

11. The method of claim 8, wherein said determining that the first graphical shape contacts the second graphical shape comprises:
determining dimensions of the first and the second graphical shapes in the electronic drawing space, wherein the dimensions are represented as at least one of coordinates, graphical shape areas, and shape perimeters; and
determining that a distance between the perimeters of the first graphical shape and the second graphical shape is zero.

12. The method of claim 8, wherein said determining that the first graphical shape contacts the second graphical shape comprises determining a distance between a center of the first graphical shape and a center of the second graphical shape.

13. The method of claim 8, wherein prior to said detecting that the first graphical shape again contacts the second graphical shape, maintaining the tentative connecting line between the first graphical shape and the second graphical shape as long as the first graphical shape is selected.

14. The method of claim 8, wherein said determining that the first graphical shape contacts the second graphical shape comprises determining that the first graphical shape overlaps the second graphical shape.

15. An apparatus comprising:
a set of one or more processors;
a memory unit coupled with the set of one or more processors; and
a drawing unit operable to,
determine that an electronic drawing space is operating in a touch mode for automatic generation of connecting lines;
determine that a first graphical shape contacts a second graphical shape in the electronic drawing space;
automatically generate and display a tentative connecting line between the first graphical shape and the second graphical shape in response to the drawing unit determining that the first graphical shape contacts the second graphical shape;
detect, after the drawing unit determines that the first graphical shape contacts the second graphical shape in the electronic drawing space, that the first graphical shape again contacts the second graphical shape;
determine, in response to the drawing unit detecting that the first graphical shape again contacts the second graphical shape, that the first graphical shape and the second graphical shape are connected with the tentative connecting line; and
automatically delete, in response to the drawing unit determining that the first graphical shape and the second graphical shape are connected with the tentative connecting line, the tentative connecting line between the first graphical shape and the second graphical shape, wherein there is no tentative connecting line or persistent connecting line between the first graphical shape and the second graphical shape.

16. The apparatus of claim 15, wherein the drawing unit comprises one or more machine-readable media.

17. The apparatus of claim 15, wherein prior to the drawing unit detecting that the first graphical shape again contacts the second graphical shape, the drawing unit is operable to convert the tentative connecting line into a persistent connecting line when the first graphical shape is unselected.

18. The apparatus of claim 15, wherein the drawing operable to determine that the first graphical shape contacts the second graphical shape comprises the drawing unit operable to:
determine dimensions of the first and the second graphical shapes in the electronic drawing space, wherein the dimensions are represented as at least one of coordinates, graphical shape areas, and shape perimeters; and
determine that a distance between the perimeters of the first graphical shape and the second graphical shape is zero.

19. The method of claim 15, wherein prior to the drawing unit detecting that the first graphical shape again contacts the second graphical shape, the drawing unit is operable to maintain the tentative connecting line between the first graphical shape and the second graphical shape as long as the first graphical shape is selected.

* * * * *